United States Patent
Canonico et al.

(10) Patent No.: US 10,563,959 B2
(45) Date of Patent: Feb. 18, 2020

(54) BALLISTIC PROTECTIVE TEXTILE STRUCTURE AND METHOD FOR MAKING IT

(71) Applicant: SAATI S.P.A., Appiano Gentile (CO) (IT)

(72) Inventors: Paolo Canonico, Appiano Gentile (IT); Paolo Gariboldi, Appiano Gentile (IT)

(73) Assignee: SAATI S.P.A., Appiano Gentile (CO) (IT)

( * ) Notice: Subject to any disclaimer, the term of this patent is extended or adjusted under 35 U.S.C. 154(b) by 681 days.

(21) Appl. No.: 14/650,561

(22) PCT Filed: Nov. 28, 2013

(86) PCT No.: PCT/IB2013/002657
§ 371 (c)(1),
(2) Date: Jun. 8, 2015

(87) PCT Pub. No.: WO2014/087212
PCT Pub. Date: Jun. 12, 2014

(65) Prior Publication Data
US 2015/0323290 A1    Nov. 12, 2015

(30) Foreign Application Priority Data

Dec. 6, 2012   (IT) .............................. MI2012A2085

(51) Int. Cl.
*F41H 5/00*    (2006.01)
*B32B 37/14*   (2006.01)
(Continued)

(52) U.S. Cl.
CPC ............... *F41H 5/00* (2013.01); *B32B 5/024* (2013.01); *B32B 5/26* (2013.01); *B32B 37/144* (2013.01);
(Continued)

(58) Field of Classification Search
CPC ..... F41H 5/00; F41H 5/0478; B32B 2305/07; B32B 2305/188; B32B 2319/00;
(Continued)

(56) References Cited

U.S. PATENT DOCUMENTS 6,642,159 B1 *  11/2003  Bhatnagar ............. B29C 70/088
                                                        428/109
2006/0040576 A1 *  2/2006  Citterio ................. F41H 5/0485
                                                        442/135
(Continued)

FOREIGN PATENT DOCUMENTS

EP      2388549 A1    11/2011
WO  2009/151484 A1    12/2009
(Continued)

OTHER PUBLICATIONS

International Search report dated Feb. 21, 2014.

*Primary Examiner* — Arti Singh-Pandey
(74) *Attorney, Agent, or Firm* — Hedman & Costigan, P.C.; James V. Costigan; Kathleen A. Costigan

(57) ABSTRACT

A composite ballistics protective textile structure comprises at least a textile element and one or more textile or thermoplastic matrix elements. The first textile element comprises unidirectional yarn fibers or flat strips. The second textile element comprises flat strip elements consisting of unidirectional yarns or thermoplastic films. Additional elements comprise thermoplastic matrix arrangements, based on rubber, elastomeric polymers or being laminated with thermoplastic films, for stabilizing the structure and reducing bullet trauma impacts.

13 Claims, 3 Drawing Sheets

(51) Int. Cl.
  *B32B 5/26* (2006.01)
  *B32B 5/02* (2006.01)
(52) U.S. Cl.
  CPC ..... *B32B 2305/07* (2013.01); *B32B 2305/188* (2013.01); *B32B 2319/00* (2013.01); *B32B 2571/02* (2013.01); *Y10T 442/3114* (2015.04)
(58) Field of Classification Search
  CPC ... B32B 2571/02; B32B 37/144; B32B 5/024; B32B 5/26; Y10T 442/3114
  See application file for complete search history.

(56) References Cited

U.S. PATENT DOCUMENTS

| | | | | |
|---|---|---|---|---|
| 2011/0269359 A1* | 11/2011 | Tam | ................ | B29C 47/0014 442/181 |
| 2011/0283875 A1* | 11/2011 | Citterio | ................ | F41H 5/0485 89/36.02 |
| 2012/0189804 A1* | 7/2012 | Chiou | ................ | B32B 5/08 428/113 |
| 2013/0059494 A1* | 3/2013 | Tam | ................ | D01F 6/04 442/59 |
| 2013/0101787 A1* | 4/2013 | Bhatnagar | ................ | D01G 25/00 428/114 |
| 2014/0072758 A1* | 3/2014 | Arvidson | ................ | F41H 5/0485 428/114 |
| 2014/0083285 A1* | 3/2014 | Marissen | ................ | F41H 5/0428 89/36.02 |
| 2014/0087125 A1* | 3/2014 | Ardiff | ................ | B32B 7/02 428/113 |
| 2014/0302274 A1* | 10/2014 | Tam | ................ | D06M 17/00 428/113 |
| 2016/0122909 A1* | 5/2016 | Ardiff | ................ | D04H 1/58 28/169 |

FOREIGN PATENT DOCUMENTS

| | | | |
|---|---|---|---|
| WO | 2011/082201 A1 | 7/2011 | |
| WO | 2011/156577 A1 | 12/2011 | |

* cited by examiner

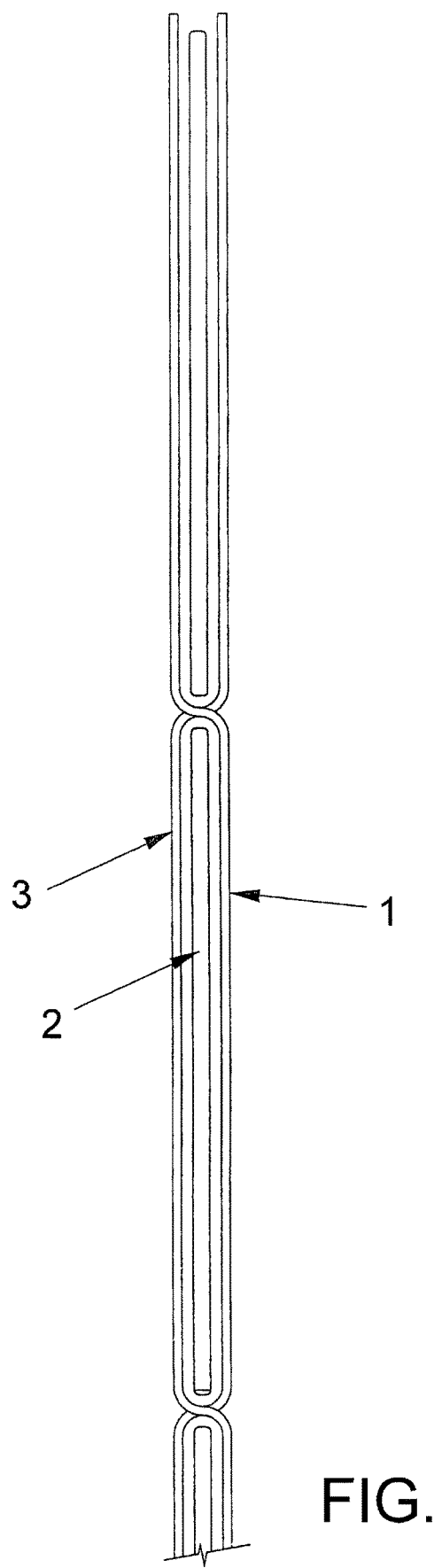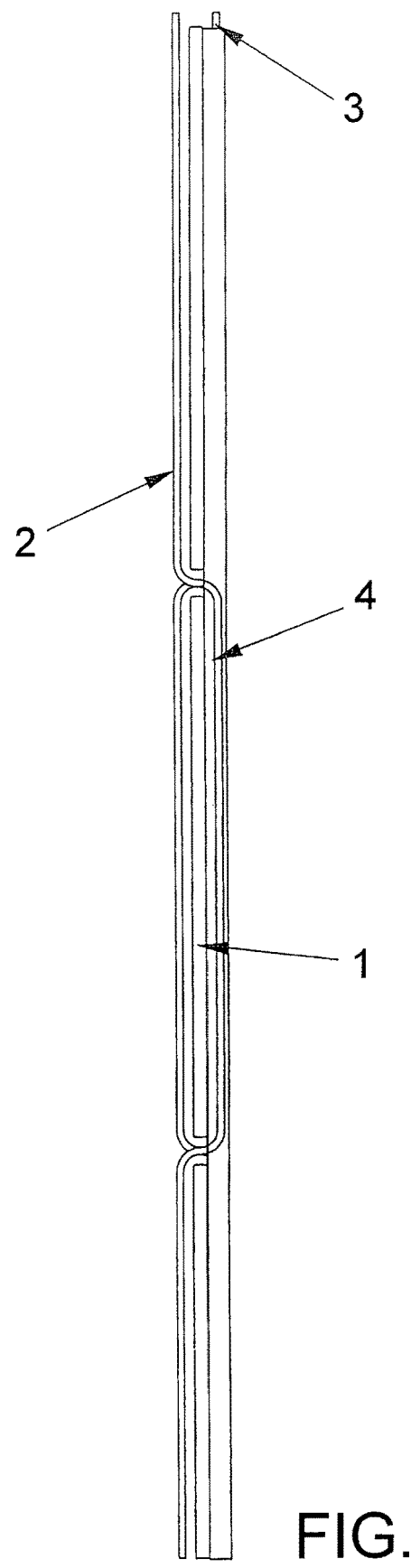

BALLISTIC PROTECTIVE TEXTILE STRUCTURE AND METHOD FOR MAKING IT

BACKGROUND OF THE INVENTION

The present invention relates to a ballistic protective textile structure and a method for making it.

More specifically, the present invention relates to a personal ballistic protective textile structure which is usually called "soft armor".

As is known, the capability of a fabric material to reject a bullet or a penetration of a knife or pointed implement, essentially depends on the nature of the textile fibers used, the fabric material weave and the fabric material weight per surface unit, or fabric areal density.

A demand of improved small weight and comfortable fabric materials for the above applications is a main market requirement in several fields of ballistic protective garments.

At present, the main reinforcement fibers forming the ballistic protective fabrics substantially comprise para-aramid and ultra-high-molecular-weight polyethylene (UHMWPE) fibers, which, owing to their peculiar mechanical characteristics, are adapted to efficiently adsorb forces applied thereon.

In the so-called "UD" or unidirectional products, the reinforcement fibers, which are arranged with a parallel arrangement, are coupled to a suitable film or resin material, substantially operating as a glue for said fibers, to allow the fiber layer to be handled in making the protective device or garment, without causing the parallel arrangement of the fibers to be changed.

In this connection, it should be pointed out that the fiber weight/matrix ratio, jointly to the yarn and support material features, control the ballistic performance of the product.

The UD ballistic protective garments usually have a flexibility and draping capability less than that of textile approaches, thereby the garment comfort conditions are very poor.

In fact, the UD article parallel fiber arrangement and, mainly, the take-up of the weave, that is a straddling of the warp and weft yarns, are design parameters providing the textile material with a maximum resistance against bullets, fragments, knives, pointed implements and so on, since said fibers are all arranged with a parallel arrangement and aligned in a single axial direction.

Because of the above mentioned taking-up of the warp and weft yarns, and consequently because of an offset of the fibers away from their axis at warp and weft yarn overlapping points, the article mechanical strength values are usually less than those of the same fibers in an UD construction.

Using high toughness fibers, such as para-aramid and UHMWPE fibers, to provide overlapped unidirectional products is already known for applications in textile structures, both flexible and stiff.

The above structures can be further subjected to impregnating processes, to improve their impact resistance, while partially modifying their bending characteristics.

Conventional methods for making the above textile articles comprise an opening step of mechanically opening the fibers and a stabilizing step, by different thermoplastic matrix arrangements.

The above process, while allowing to properly exploit the yarns and reduce the finished product weight, on the other hand greatly reduces the mechanical characteristics of the yarns.

In this connection, it should be pointed out that different commercial approaches are at present available, of a non-monolithic nature, that is different from homogeneous fabrics, to meet different related standards, and providing articles resisting against conventional bullets, but not against those of military guns, in which case an improved protective capability is required, usually achieved by additional reinforcement plates (for example of ceramics and UHMWPE materials).

SUMMARY OF THE INVENTION

Accordingly, the aim of the present invention is to provide such a composite construction textile product and a method for making it, for the ballistic protective field, overcoming the above mentioned problems of prior textile constructions, while preserving the typical bending properties of fabric materials.

Within the scope of the above mentioned aim, a main object of the invention is to provide such a textile product, and a method for making it, providing an alternative textile structure for UD products, while overcoming the limitations of the latter.

Actually, in many industrial applications, the protective garment comprising open fibers unidirectionally (UD) arranged on a thin resin or thermoplastic film layer, replaces fabric materials by providing a smaller areal density value while preserving a high ballistic performance, the garment weight being the same, since the UD products are not made by textile methods, but by other processes typical of other industrial fields.

Within the above mentioned aim, a main object of the invention is to provide such a composite textile garment or construction including warp yarns preferably consisting of a para-aramid or ultra high molecular polyethylene (UHMPE), glass, polybenzoxazole (PBO) fibers, and weft yarns of a thermoplastic material such as polyethylene terephthalate (PET), polypropylene (PP), polyethylene (PE), UHMWPE, polyurethane (PU) and so on, in a para-aramid film or yarn strip form.

The construction thus made is moreover processed by a suitable laminating method, to partially soften or melt the weft yarn thermoplastic material and provide warp fibers made rigid with one another by the unidirectional weft yarn thermoplastic material operating as a binding material.

This solution, if used in combination with a set number of other layers of the same type or even of different textile structures and materials, allows, the areal density being the same, to provide a quick dissipation of the penetrating bullet energy, thereby stopping the movement and penetration of the bullet.

The hereinbelow disclosed construction and method are mainly used for making ballistic protective garments or products, either of a hybrid or a monolithic type, for the above so-called soft protection applications.

According to one aspect of the present invention, the above mentioned aim and objects, as well as yet other objects, which will become more apparent hereinafter, are achieved by a ballistic protective textile structure or construction and a method for making it, as claimed in the enclosed claims.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative but not limitative example, in the accompanying drawings, where:

FIG. 2 is a cross-sectional view of the ballistic protective textile structure according to the invention;

FIG. 3 is another cross-sectional view of the ballistic protective textile structure according to the invention.

DESCRIPTION OF THE PREFERRED EMBODIMENTS

Figure 1:
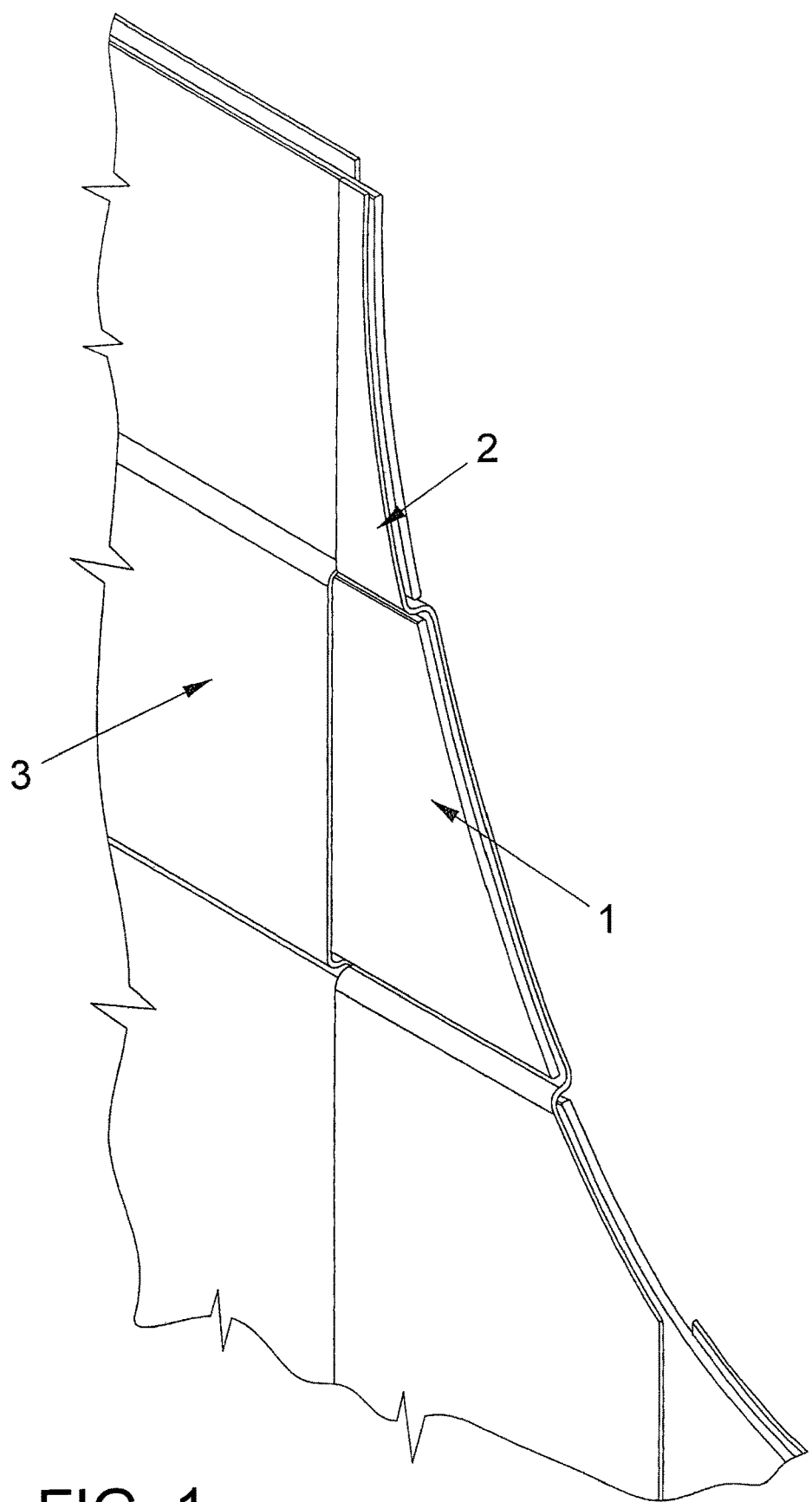
FIG. 1 is a perspective view of the ballistic protective textile structure according to the present invention.

With reference to the number references of the above mentioned figures, the method according to the present invention comprises a first flat or plain weaving step, in which a first element, generally indicated by the reference number 1, comprising unidirectional warp fibers or flat strips is made.

Said flat strips are arranged on suitable creels and are interleaved in a warp arrangement with a second element 2, consisting of like unidirectional thread flat strips, or a thermoplastic matrix film.

The warp components can comprise either warp yarns or flat strips made of a para-aramid matrix, such as KEVLAR® (poly-paraphenylene terephthalamide), TWARON® (p-phenylene terephthalamide) or the like, as commercially available, or warp yarns or flat strips of a ultra-high-molecular-weight polyethylene (UHMWPE) matrix, such as SPECTRA® (gel-spun UHMWPE), DYNEEMA® (gel-spun UHMWPE), TENSYLON® (UHMWPE material), or the like as commercially available.

The weft yarns advantageously comprises high toughness yarns.

In this connection, it should be pointed out that the yarns used do not have any linear density limitations.

The weft yarns, in turn, comprise flat strip elements of a para-aramid matrix, such as KEVLAR®, TWARON® or other commercially available para-aramid matrix arrangements, as suitably processed by glue, adhesive or thermoplastic materials, or further flat strip elements of a UHMWPE matrix, such as SPECTRA®, DYNEEMA®, TENSYLON®, or other commercially available arrangements, or further thermoplastic films such as PE, PU, PP, polyamide (PA), ethylene-vinyl acetate (EVA), or, in principle, any desired or target thermoplastic material suitable for extruding a film.

The most suitable condition for holding such a yarn/thermoplastic material ratio without negatively affecting the end energy or power dispersion properties, is achieved by using, as a weft pick or yarn arrangements, flat strip elements of a height less than or equal to 2 cm.

The material thus made is subject to a further stabilizing process, comprising partially melting the thermoplastic matrix by hot calendering or laminating, or by "IR" lamps, operating under operative conditions varying depending on the thermoplastic material used.

The stabilizing method can be carried out both in-line on the loom, and in parallel on dedicated systems.

The above material combination can be further impregnated by additional elements, indicated by the reference number 3, such as thermoplastic matrixes based on rubber or elastomeric polymers or a combination thereof, or being laminated by different thermoplastic films such as PE, PU, PP, PA, EVA or, in principle, by any thermoplastic materials providing an extruded film.

The above mentioned additional components facilitate an impact energy distribution through the underlying support, owing to a viscoelastic fiber deforming, breaking or fibrillating.

The thermoplastic impregnation moreover properly compacts either one or more support layers, including the above mentioned elements 1 and 2, by a molding method.

Figure 5:
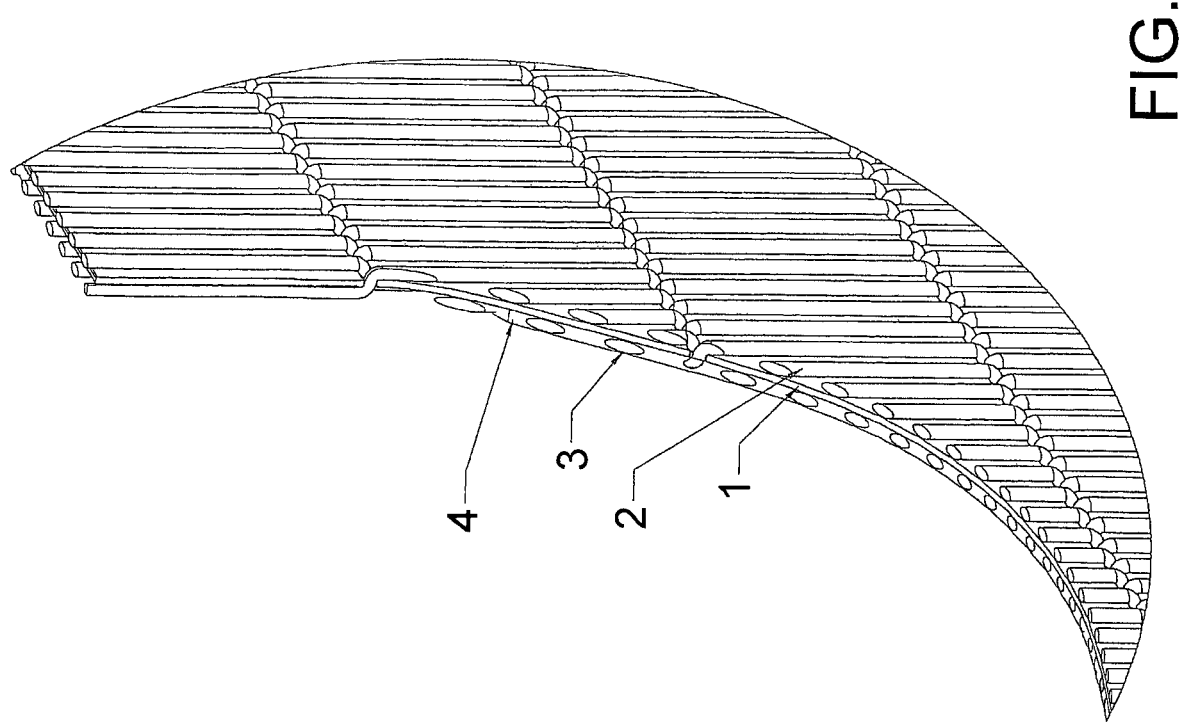
FIGS. 4 and 5 show two further partially cross-sectioned perspective views of the ballistic protective textile structures according to the present invention.
Figure 4:
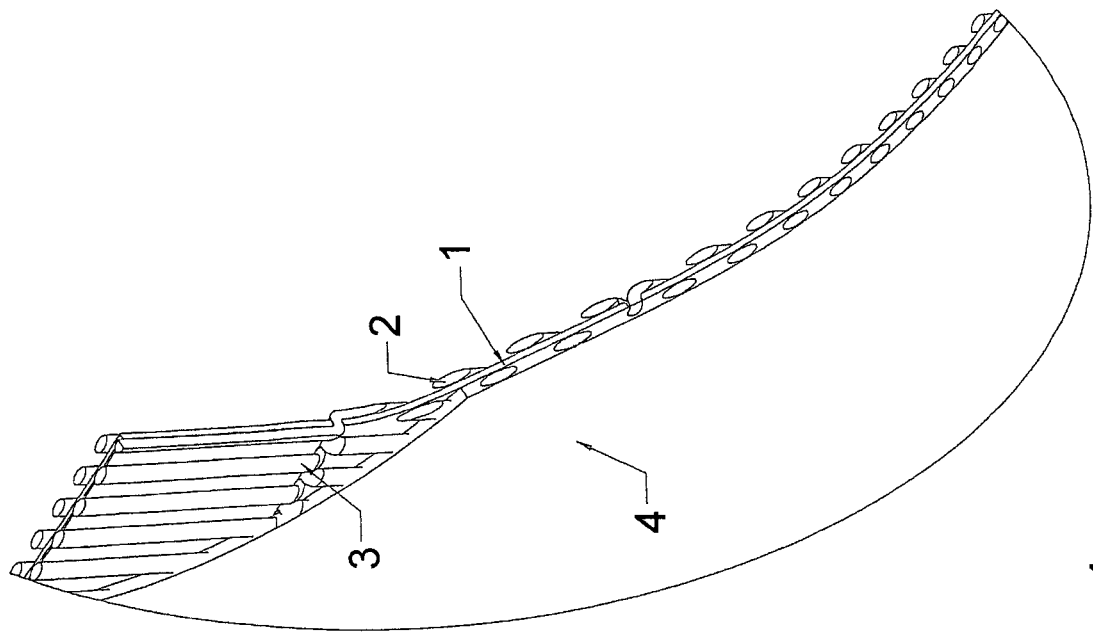

With reference to FIGS. 4 and 5, examples of the subject textile structures are herein shown, the reference number 1 showing a thermoplastic film or yarn flat strip having a high toughness, and the reference number 2 indicating high toughness yarns, the reference number 3 also indicating high toughness yarns and 4 a thermoplastic film—web—nonwoven fabric.

Ballistic data show that the above structure does not provide results like those which can be achieved by individual layers.

In fact, the presence of a gap or discontinuity, facilitates a reduction of traumas deriving from a bullet impact, and an improved energy distribution.

Said discontinuity or gap can comprise air, or any other desired materials, such as different density and thickness felt or foamed materials.

The examples mentioned hereinbelow have been achieved by experimental tests performed by the Applicant and are herein shown only by way of an illustrative and not limitative purpose.

The tests shown, in particular, are related to packages having a weight from 5.10 kg/m2 and 5.2 kg/m2, depending on the individual layer weights.

The packages have been applied to a plasticine block designed to verify traumas of bullets fired with a firing speed according to the NIJ standard, that is Cal. 9 mm FMJ RN and 44 Mag. JHC bullets, to measure the VO value.

For each package three shots have been fired.

Example 1

28 layers of a 0°/90° crossed unidirectional fabric comprising a 930 dtex multifilament para-aramid fiber warp (element 1) and a middle toughness 2 cm TENSYLON® flat strip (element 2) being stabilized by a PE base thermoplastic film.

The speed and trauma data are shown in the following table:

| Shot No. | Bullet speed (m/s) | Trauma mm | Panel weight Kg/m2 | Average trauma (mm) |
|---|---|---|---|---|
| Cal. 9 mm FMJ RN | | | | |
| 1 | 444 | 30 | 5.12 | 29.7 |
| 2 | 437 | 31 | | |
| 3 | 429 | 28 | | |
| Cal. 44 Mag. | | | | |
| 1 | 439 | 48 | 5.13 | 48.6 |
| 2 | 435 | 44 | | |
| 3 | 439 | 54 | | |

Example 2

38 layers of a 0°/90° crossed unidirectional fabric comprising a 930 dtex multifilament para-aramid fiber warp (element 1) and a 2 cm ionomeric polyethylene film flat strip (element 2).

The speed and trauma data are shown in the following table:

| Shot No. | Bullet speed (m/s) | Trauma mm | Panel weight Kg/m2 | Average trauma (mm) |
|---|---|---|---|---|
| Cal. 9 mm FMJ RN | | | | |
| 1 | 439 | 34 | 5.12 | 35.7 |
| 2 | 444 | 38 | | |
| 3 | 437 | 35 | | |
| Cal. 44 Mag. JHC | | | | |
| 1 | 436 | 63 | 5.12 | 60 |
| 2 | 445 | 58 | | |
| 3 | 440 | 59 | | |

Example 3

54 layers of a 0°/90° crossed unidirectional fabric comprising a 670 dtex multifilament para-aramid fiber warp (element 1) and a 2 cm ionomeric polyethylene film flat strip (element 2).

The speed and trauma data are shown in the following table:

| Shot No. | Bullet speed (m/s) | Trauma mm | Panel weight Kg/m2 | Average trauma (mm) |
|---|---|---|---|---|
| Cal. 9 mm FMJ RN | | | | |
| 1 | 436 | 32 | 5.20 | 33.0 |
| 2 | 441 | 35 | | |
| 3 | 439 | 32 | | |
| Cal. 44 Mag. JHG | | | | |
| 1 | 428 | 51 | 5.10 | 52.7 |
| 2 | 445 | 55 | | |
| 3 | 444 | 52 | | |

It has been found that the invention fully achieves the intended aim and objects.

In practicing the invention, the chosen details may be different both with respect to the individual constructional layer of the package, and with respect to the individual layer component elements.

The invention claimed is:

1. A ballistics protective bullet-resistant textile structure providing a quick dissipation of an energy of a penetrating bullet, comprising:
   a first warp textile element comprising unidirectional matrix yarns or flat strips;
   a second weft textile element consisting of unidirectional flat strips of a thermoplastic material;
   said unidirectional yarns or flat strips of said first warp textile element being interleaved in a warp arrangement with said second weft textile element;
   said thermoplastic material of second weft textile element being partially softened or melted to rigidly bind said unidirectional matrix yarns or flat strips of said first warp textile element; and
   a third non-textile stabilizing element impregnated in said first warp textile element and said second weft textile element for stabilizing and reducing bullet impact traumas, said third non-textile stabilizing element comprising rubber or elastomeric polymer materials or a combination thereof laminated with thermoplastic films;
   said first warp textile element comprising para-aramid matrix yarns or flat strips, or yarns or flat strips of an ultra-high-molecular-weight polyethylene (UHMWPE) matrix;
   said second weft textile element consisting of flat strips of a para-aramid matrix, processed by glue, adhesive or thermoplastics matrix materials, or UHMWPE matrix flat strips, or thermoplastics films such as polyethylene (PE), polyurethane (PU), polypropylene (PP), polyamide (PA), ethylene-vinyl acetate (EVA), or any thermoplastics materials adapted to be extruded to a film form; and
   said weft flat strips having a height less than or equal to 2 cm.

2. A structure, according to claim 1, characterized in that said first warp element and second weft element are at least partially impregnated or laminated.

3. A method for making a ballistic protective bullet-resistant textile structure, according to claim 1, said method comprising the steps of:
   providing said first textile warp element comprising unidirectional matrix yarns or flat strips adapted to dissipate a portion of a bullet impact energy by breaking or fibrillating said matrix yarns or flat strips;
   providing said second textile thermoplastic material weft element comprising unidirectional matrix flat strips for further dissipating said bullet impact energy;
   arranging on a creel said first warp element;
   interweaving in a warp arrangement said first warp element with said second weft element; and
   partially melting said second weft element, thereby causing the thermoplastic material of said second weft element to rigidly bind said warp element matrix yarns or flat strips to one another; and
   impregnating said first warp textile element and said second weft textile element with said third non-textile element comprising rubber or elastomeric polymer materials or a combination thereof laminated with thermoplastic films for stabilizing and reducing traumas due to a bullet impact.

4. A method according to claim 3, characterized in that said partial melting of said second weft element is carried out by calendering.

5. A method, according to claim 3, characterized in that said partial melting of said second weft element is carried out by a hot laminating.

6. A method according to claim 3, characterized in that said partial melting of said second weft element is carried out by IR lamps.

7. A method according to claim 3, characterized in that said method further comprises the step of impregnating said structure by thermoplastics matrix materials comprising rubber or elastomeric polymers or a combination thereof, or laminating said structure by thermoplastics films selected from PE, PU, PP, PA, EVA, or any thermoplastics materials adapted to be extruded to a film form.

8. A method according to claim 3, characterized in that said method further comprises the step of molding to a compact condition one or more layers of said first warp element and second weft element.

9. A method according to claim 3, characterized in that said method is carried out on-line on a loom.

10. A method according to claim 3, characterized in that said method is carried out on parallel weaving systems.

11. A method according to claim 3, characterized in that said first warp textile element comprises para-aramid matrix yarns or flat strips, or yarns or flat strips of a UHMWPE matrix.

12. A method according to claim 3, characterized in that said second textile weft element consists of flat strips of a para-aramid matrix, processed by glue, adhesive or thermoplastics matrix materials, or UHMWPE matrix flat strips, or thermoplastics films such as PE, PU, PP, PA, EVA, or any thermoplastics materials adapted to be extruded to a film form.

13. A method according to claim 3, characterized in that said weft flat strips have a height less than or equal to 2 cm.

\* \* \* \* \*